United States Patent
Adler et al.

(10) Patent No.: US 11,279,314 B2
(45) Date of Patent: Mar. 22, 2022

(54) OCCUPANT RESTRAINT SYSTEM

(71) Applicant: ZF Passive Safety Systems US Inc., Washington, MI (US)

(72) Inventors: Angelo Adler, Shelby Township, MI (US); Kurt F. Fischer, Rochester, MI (US); Alexandra Schroeder, Lenox, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 73 days.

(21) Appl. No.: 16/783,250

(22) Filed: Feb. 6, 2020

(65) Prior Publication Data
US 2021/0245699 A1 Aug. 12, 2021

(51) Int. Cl.
| | |
|---|---|
| *B60R 21/231* | (2011.01) |
| *B60R 21/207* | (2006.01) |
| *B60R 21/215* | (2011.01) |
| *B60R 21/21* | (2011.01) |
| *B60R 21/01* | (2006.01) |
| *B60R 21/213* | (2011.01) |

(52) U.S. Cl.
CPC ........ *B60R 21/23138* (2013.01); *B60R 21/01* (2013.01); *B60R 21/207* (2013.01); *B60R 21/21* (2013.01); *B60R 21/213* (2013.01); *B60R 21/215* (2013.01); *B60R 2021/01013* (2013.01); *B60R 2021/01231* (2013.01); *B60R 2021/23146* (2013.01)

(58) Field of Classification Search
None
See application file for complete search history.

(56) References Cited

U.S. PATENT DOCUMENTS

| | | | | |
|---|---|---|---|---|
| 5,575,497 A | * | 11/1996 | Suyama | B60R 21/231 280/730.1 |
| 5,630,616 A | * | 5/1997 | McPherson | B60R 21/207 280/728.2 |
| 5,678,852 A | * | 10/1997 | Brown | B60R 21/207 280/730.2 |
| 7,802,809 B2 | * | 9/2010 | Ryan | B60R 21/231 280/730.2 |
| 8,882,138 B1 | * | 11/2014 | Hicken | B60R 21/231 280/730.1 |
| 9,598,042 B2 | * | 3/2017 | Schneider | B60R 21/231 |
| 10,864,877 B2 | * | 12/2020 | Nagasawa | B60R 21/207 |
| 2004/0195029 A1 | * | 10/2004 | Feldman | B60N 2/5883 180/271 |
| 2017/0210329 A1 | * | 7/2017 | Rao | B60R 21/261 |

FOREIGN PATENT DOCUMENTS

| | | | |
|---|---|---|---|
| JP | 04166452 A | * | 6/1992 |
| JP | 07323802 A | * | 12/1995 |

* cited by examiner

*Primary Examiner* — Faye M Fleming
(74) *Attorney, Agent, or Firm* — Tarolli, Sundheim, Covell & Tummino LLP (57) ABSTRACT

A method for helping to protect an occupant of a vehicle having a side structure and a cabin with a seat for the occupant includes providing an airbag in a stored condition offset from a centerline of the seat. The airbag has a first portion and a second portion fluidly connected with one another. The first portion is inflated and deployed to a position lateral of the occupant. The second portion is inflated and deployed from the first portion to a position in front of the occupant.

32 Claims, 9 Drawing Sheets

OCCUPANT RESTRAINT SYSTEM

TECHNICAL FIELD

The present invention relates generally to vehicle airbags and, in particular, relates to airbags providing frontal and side protection for vehicle occupants.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

In one aspect, a method for helping to protect an occupant of a vehicle having a side structure and a cabin with a seat for the occupant includes providing an airbag in a stored condition offset from a centerline of the seat. The airbag has a first portion and a second portion fluidly connected with one another. The first portion is inflated and deployed to a position lateral of the occupant. The second portion is inflated and deployed from the first portion to a position in front of the occupant.

In another aspect, a method for helping to protect an occupant of a vehicle having a side structure and a cabin with a seat for the occupant includes providing an airbag in a stored condition outboard from a centerline of the seat. The airbag has a first portion and a second portion fluidly connected with one another through an opening in a panel. The first portion is inflated and deployed to a position lateral of the occupant and then the second portion is inflated and deployed from the first portion to a position in front of the occupant.

According to one aspect, taken alone or in combination with any other aspect, the first portion is inflated to a first fluid pressure and the second portion is inflated to a second fluid pressure less than the first fluid pressure.

According to one aspect, taken alone or in combination with any other aspect, a panel is provided for interconnecting the first and second portions and an opening extends through the panel to fluidly connect the first and second portions with one another.

According to one aspect, taken alone or in combination with any other aspect, the opening is sized such that the first portion fully inflates before the second portion begins inflating.

According to one aspect, taken alone or in combination with any other aspect, the first portion inflates and deploys prior to inflating and deploying the second portion.

According to one aspect, taken alone or in combination with any other aspect, the first portion is inflated and deployed to a position between the occupant and the side structure According to one aspect, taken alone or in combination with any other aspect, the second portion is configured to inflate to a position in close proximity with the occupant's legs According to one aspect, taken alone or in combination with any other aspect, the airbag is positioned in a pillar of the vehicle.

According to one aspect, taken alone or in combination with any other aspect, the airbag is positioned in a door of the vehicle.

According to one aspect, taken alone or in combination with any other aspect, the airbag is positioned in a seat base of the seat.

According to one aspect, taken alone or in combination with any other aspect, the airbag is positioned in a seat back of the seat.

According to one aspect, taken alone or in combination with any other aspect, the first portion extends from an upper end positioned adjacent a headrest of the seat to a lower end positioned adjacent a lower torso of the occupant.

According to one aspect, taken alone or in combination with any other aspect, the first portion includes an inboard facing side and an outboard facing side. The second portion deploys from the inboard facing side.

According to one aspect, taken alone or in combination with any other aspect, the second portion extends from an upper end positioned adjacent a head of the occupant to a lower end positioned adjacent a lower torso of the occupant.

According to one aspect, taken alone or in combination with any other aspect, the first portion and the second portion cooperate to form a substantially L-shaped airbag.

According to one aspect, taken alone or in combination with any other aspect, a sensor senses the occurrence of an event for which deployment of the airbag is desired and produces a signal indicative thereof. An inflator is actuated to inflate and deploy the first and second portions in response to the signal.

Other objects and advantages and a fuller understanding of the invention will be had from the following detailed description and the accompanying drawings.

DETAILED DESCRIPTION

Figure 1:
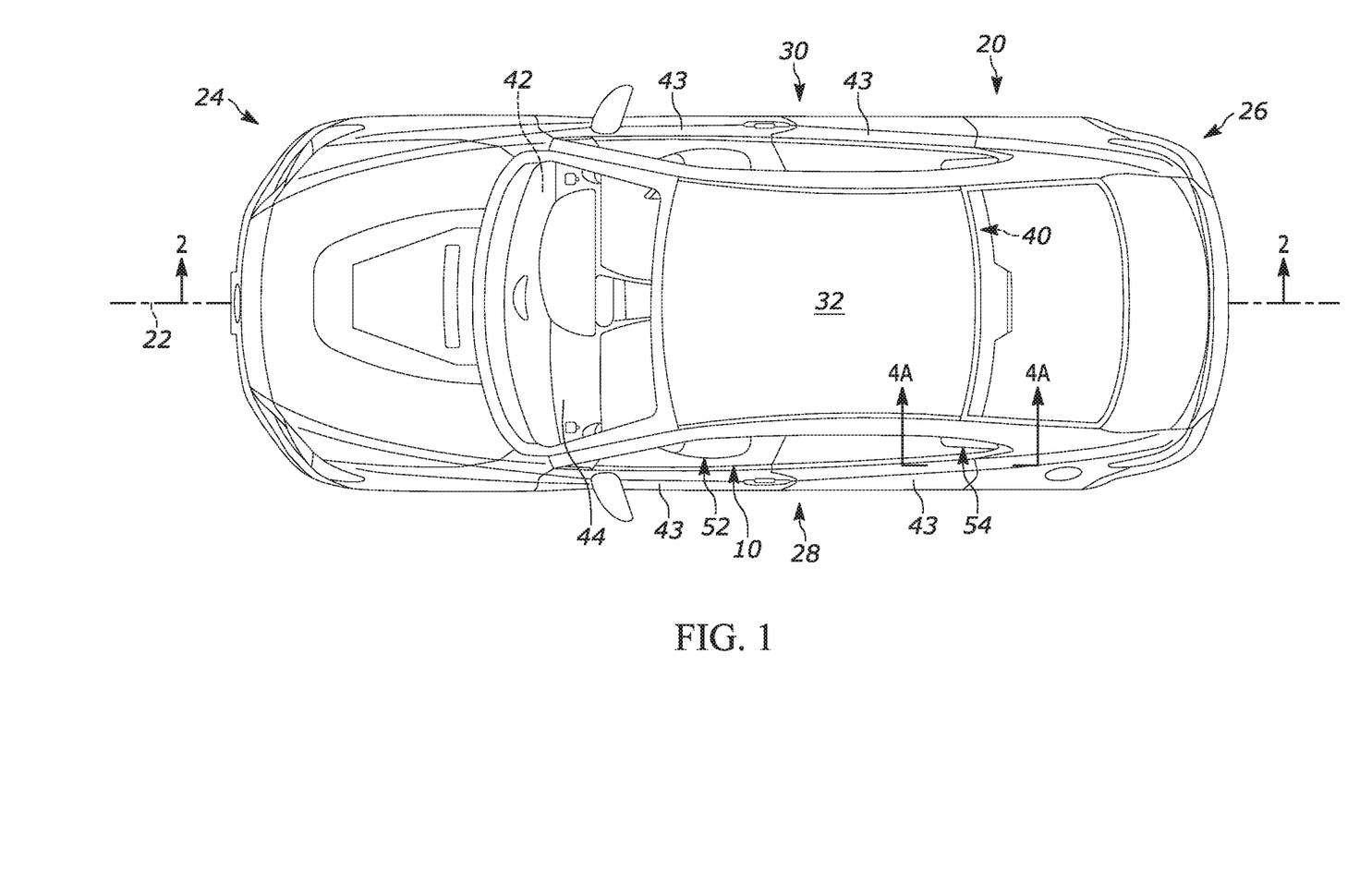
FIG. 1 is a top view of a vehicle including an example occupant restraint system.
Figure 2:
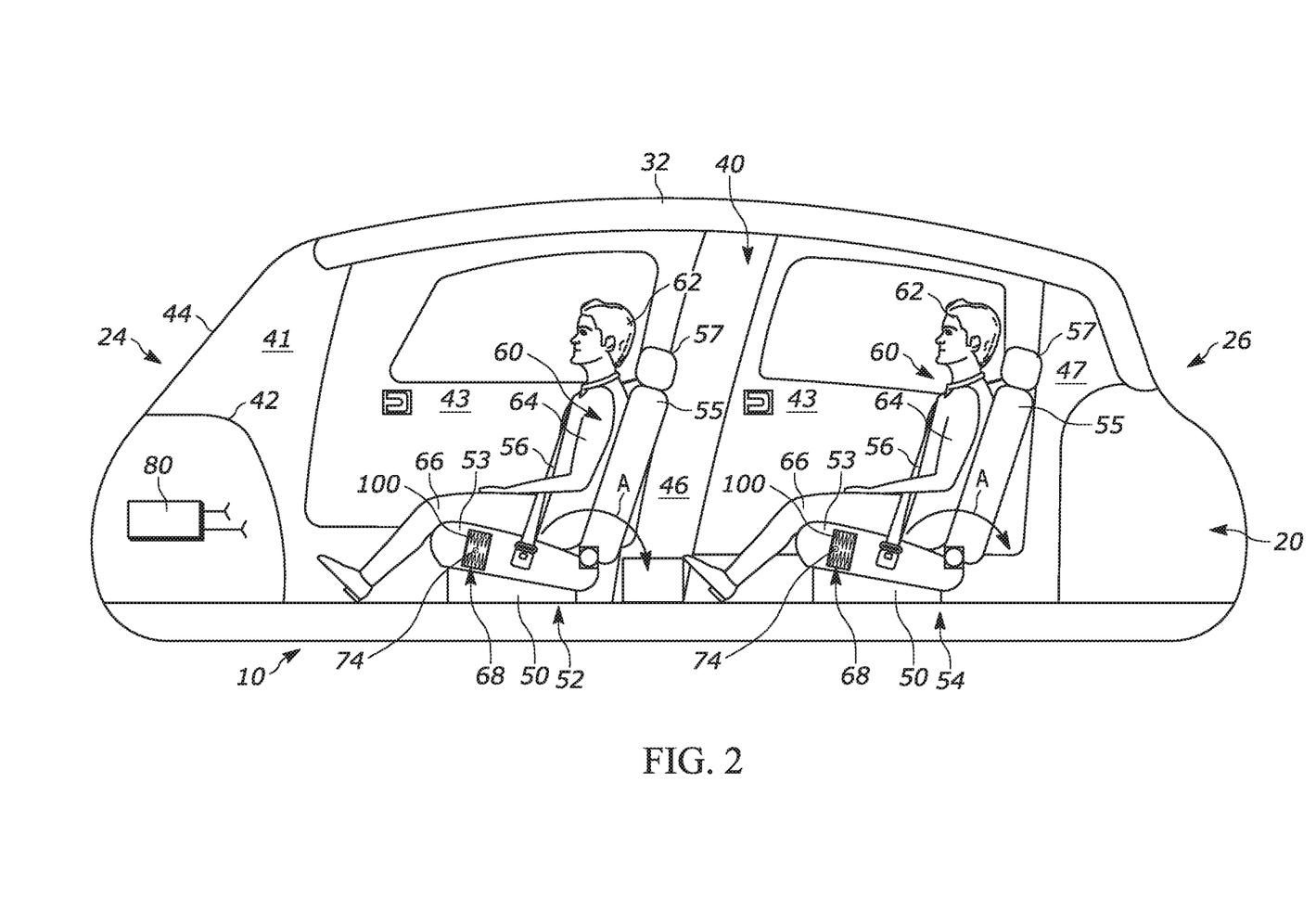
FIG. 2 is a schematic illustration of a cabin of the vehicle with a first seating arrangement and example airbags of the restraint system in a stored condition mounted in a vehicle seat.

The present invention relates generally to vehicle airbags and, in particular, relates to airbags providing frontal and side protection for vehicle occupants. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. Each side 28, 30 includes side structure, namely, an A-pillar 41, a B-pillar 46, and a C-pillar 47 and doors 43 connected to the pillars.

The first end 24 of the vehicle 20 includes an instrument panel 42 facing a passenger compartment or cabin 40. A windshield or windscreen 44 is located between the instrument panel 42 and the roof 32. The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, arranged in a forward-facing manner similar to that of conventional automobiles. It will be appreciated that the vehicle 20 could alternatively include more or fewer rows of seats 50 (not shown). In any case, a seatbelt 56 is associated with each seat 50 for restraining an occupant 60 in that seat.

Figure 3:
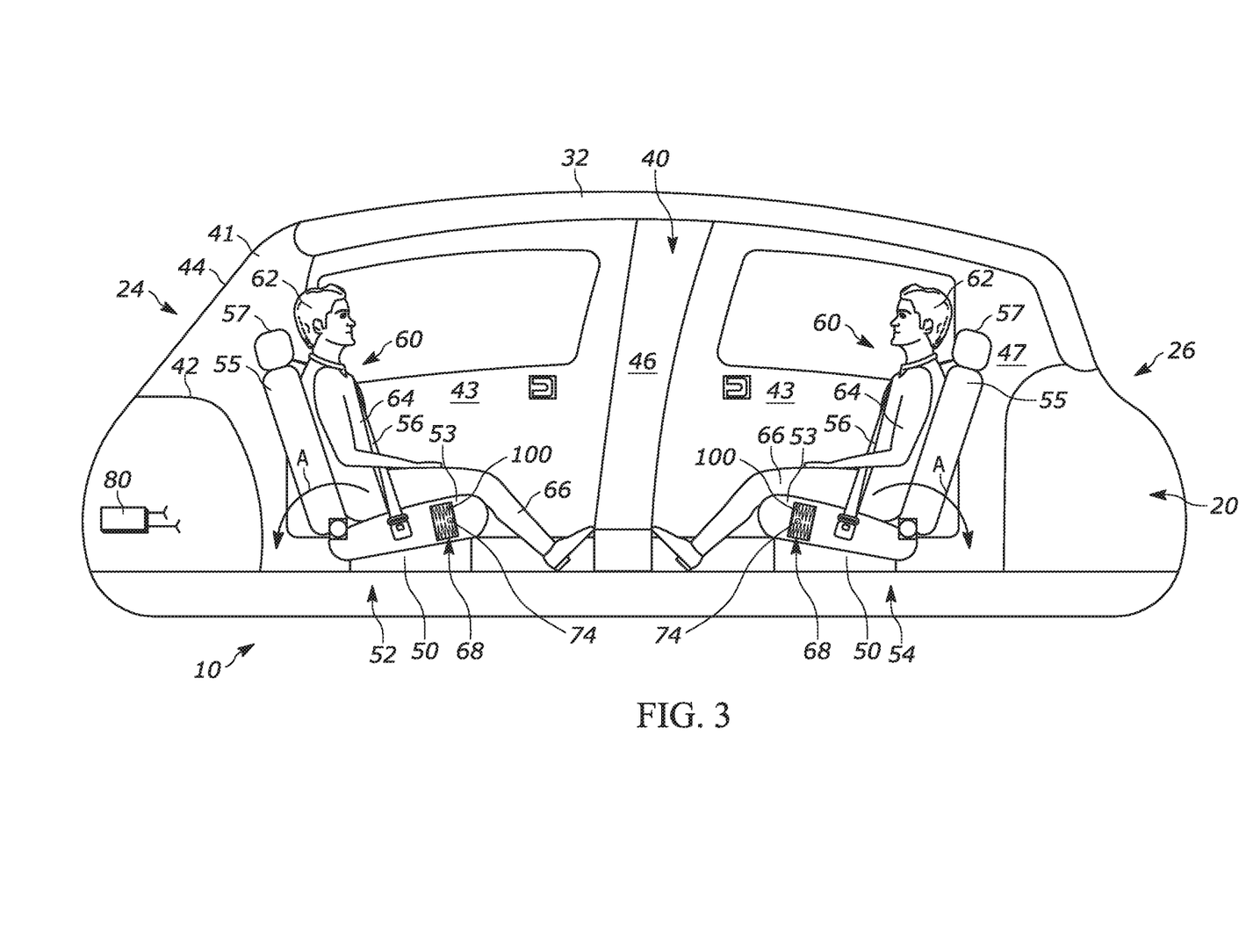
FIG. 3 is a schematic illustration of the cabin of the vehicle with a second seating arrangement and example airbags of the restraint system in a stored condition mounted in a vehicle seat.

In another seating arrangement shown in FIG. 3, the vehicle 20 includes two rows of seats 50 that face each other, with the front for 52 being rearward-facing and the rear row 54 being forward-facing. For the conventional, forward-facing seating arrangement of FIG. 2, in the event of a frontal crash, the occupants 60 of both the front and rear rows 52, 54 are restrained by their respective seatbelts 56. Additional restraints are, however, desirable for head and neck support. This additional protection is typically provided, at least for the front row 52 occupants, by instrument panel mounted airbags.

In an autonomous vehicle 20, however, the instrument panel 42 can be reduced in size and/or removed altogether. Control interfaces for climate controls, GPS, navigation, entertainment, etc. can, for example, be provided in a center console area of the vehicle 20 located between the occupants 60 of the front and/or rear rows 52, 54.

That said, for the unconventional, forward-rearward seating arrangement of FIG. 3, in the event of a frontal crash, the occupants 60 of the forward-facing rear row 54 are restrained by their respective seatbelts 56. Occupants 60 of the rear-facing front row 52, while buckled, are supported in a frontal crash by the seat backs of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

Regardless of the seating arrangement, each seat 50 extends along a forward-rearward centerline 51 and includes a base or bottom 53 for receiving the legs 66 of the occupant 60. A seat back 55 extends from the base 53 towards the roof 32 and receives the upper torso 64 of the occupant 60. A headrest 57 is connected to the seat back 55 and receives the head 62 of the occupant 60. The position of the seat back 55 relative to the base 53 is adjustable by the user, either manually by a lever or electronically. More specifically, the seat back 55 can pivot or recline relative to the base 53 in the manner indicated by the arrow A. The seat 50 can also rotate to face forward, rearward, inboard, outboard or in between (not shown).

In either seating arrangement, since the front row 52 need not face forward and/or need not be in close proximity to the instrument panel 42 or the area where an instrument panel would normally reside, there can be a large volume of space between the front row and the forward cabin structure presented facing the front row. That said, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel or steering wheel, presents additional challenges.

To account for these challenges, the occupant restraint system 10 shown in FIGS. 2-6B includes vehicle occupant protection devices in the form of inflatable airbags 100 mounted outboard of the centerline 51 of each associated seat 50 within the front and rear rows 52, 54. The airbags 100 can be mounted, for example, to the vehicle seat 50 or the side structure. Mounting the airbags 100 outboard of the seat centerline 51 is convenient because the airbags can be positioned in locations with a desired proximity to the occupants 60 they are intended to help protect. This can help reduce the necessary inflatable volume of the airbags 100 and can also help provide a desired airbag deployment time without requiring an excessively high-volume inflator.

The airbags 100 are at least one of rolled or folded before being placed outboard of the centerline 51. The rolled airbags 100 can each be provided in a cover or housing/module 68 that is then placed in the seat 50 or side structure. The occupant restraint system 10 also includes an inflator 74 positioned in each module 68 for providing inflation fluid to the respective airbag 100. The inflators 74 are operatively connected (e.g., by wires) to an airbag controller 80 (see FIG. 2) that includes or communicates with one or more crash sensors (not shown). The airbag controller 80 is operative to determine the occurrence of a crash event and to actuate the inflators 74 in a known manner to inflate the airbags 100 associated therewith. The inflators 74 can be of any known type, such as stored gas, solid propellant, augmented or hybrid.

The airbags 100 can be constructed of any suitable material, such as nylon (e.g., woven nylon 6-6 yarns), and may be constructed in any suitable manner. For example, the airbags 100 may include one or more pieces or panels of material. If more than one piece or panel is used, the pieces or panels can be interconnected by known means, such as stitching, ultrasonic welding, heat bonding, or adhesives, to form the airbags 100. The airbags 100 can be uncoated, coated with a material, such as a gas impermeable urethane, or laminated with a material, such as a gas impermeable film. The airbags 100 can therefore have a gas-tight or substantially gas-tight construction. Those skilled in the art will appreciate that alternative materials, such as polyester yarn, and alternatives coatings, such as silicone, may also be used to construct the airbags 100.

The occupant restraint system 10 can include multiple airbags 100 provided at locations associated with each seat 50 in each row 52, 54. When the airbags 100 are provided in the vehicle seats 50, the airbags are mounted to the seats offset from the centerline 51 regardless of whether the seat is forward-facing or rearward-facing and regardless of which row 52, 54. With this in mind, the position of the stored airbags 100 (e.g., inboard, outboard, forward or rearward) relative to the centerline 51 can change if the seat 50 is rotatable. In other words, while the stored airbag 100 can initially be outboard of the centerline 51 when the seat 50 in the rear row 54 initially faces forward (as shown), rotating the seat to face rearward positions the stored airbag inboard of the centerline 51.

When the airbags 100 are provided along the vehicle side structure, the airbags associated with the front row 52 can be mounted in the B-pillar 46 or front doors 43 for the forward-facing seating arrangement. The airbags 100 associated with the rear row 54 are mounted in the C-pillar 47 or rear doors 43 (see FIG. 2). In the rearward-facing seating arrangement, the airbags 100 associated with the front row 52 can be mounted in the A-pillar 46 or front doors 43. The airbags 100 associated with the rear row 54 can be mounted in the C-pillar 47 or rear doors 43 (see FIG. 3).

In each case, each row 52, 54 in the vehicle 20 can have a separate pair of modules 68 (with corresponding airbag 100 and inflator 74) associated therewith on opposite sides 28, 30 of the vehicle 20. Although the airbags 100 are similar for each row 52, 54 and each side 28, 30 of the vehicle 20, the construction and operation of only the airbag associated with the seat 50 in the second row 54 on the left side 28 is discussed for brevity.

Figure 4A:
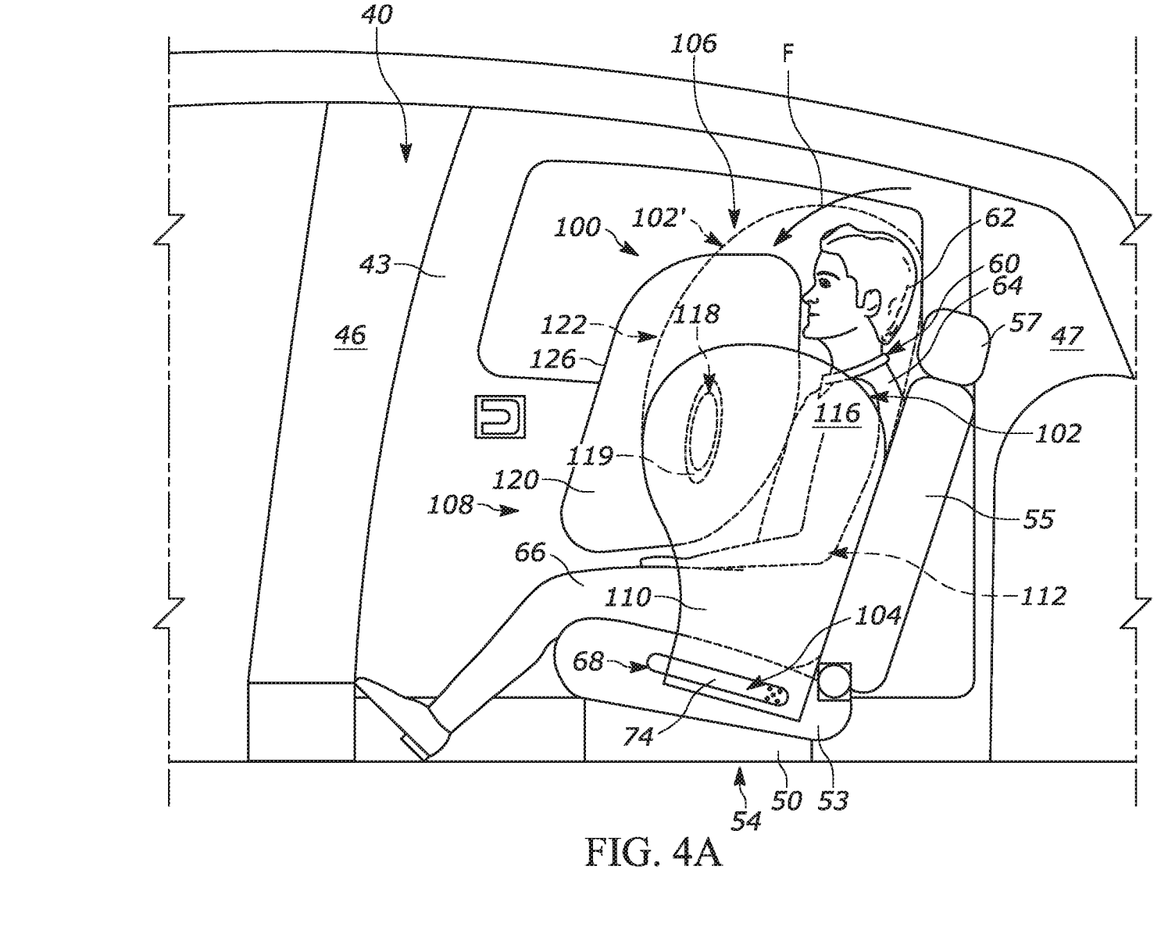
FIG. 4A is a side view of the cabin with the airbag in a deployed condition.
Figure 4B:
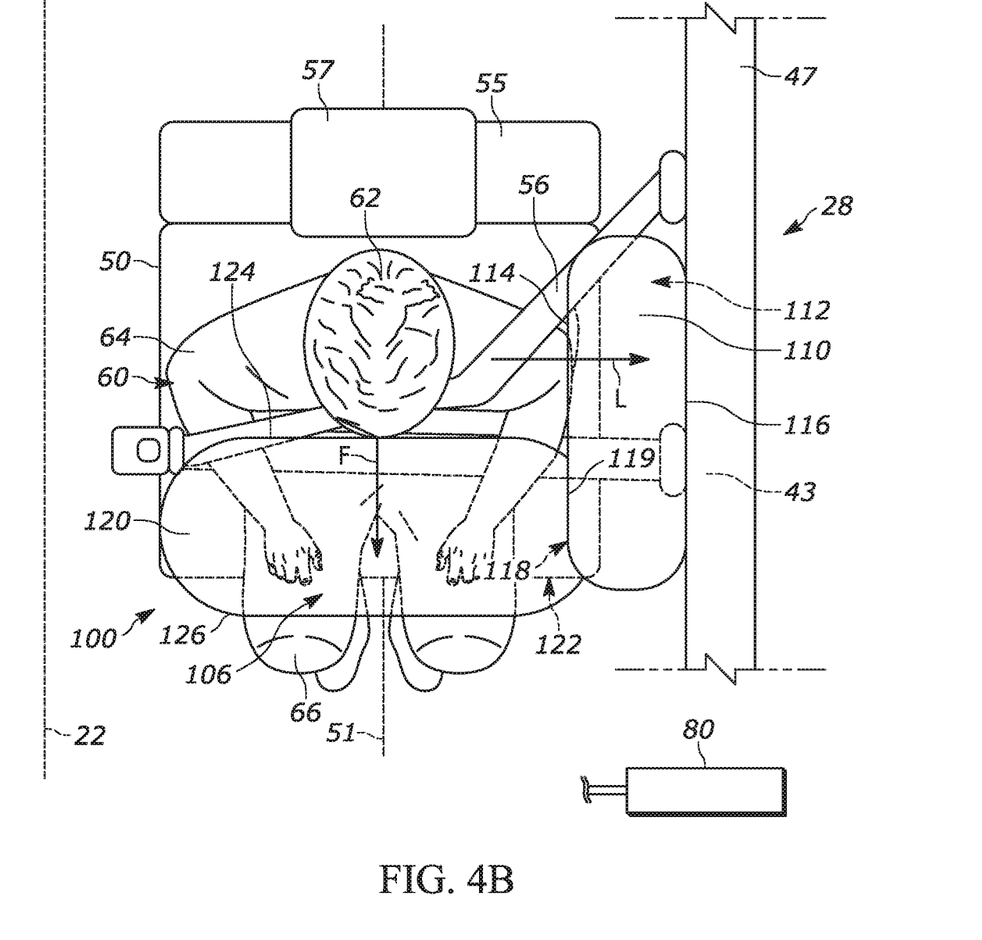
FIG. 4B is a top view of the airbag of FIG. 4A.

In the example shown in FIGS. 4A-4B, the module 68 is mounted in the base 53 of the seat 50. Upon sensing the occurrence of an event for which inflation of the airbag 100 is desired, such as a frontal vehicle collision, the controller 80 provides signals to the inflator 74. Upon receiving the signals from the controller 80, the inflator 74 is actuated and provides inflation fluid to the inflatable volume of the airbag 100 in a known manner. The inflating airbag 100 exerts a force on the base 53, which causes the base to open (e.g., via tear seam or door). This releases the airbag 100 to inflate and deploy from a stored condition behind the base 53 to a deployed condition extending into the cabin 40 both between the seat 50 in the front row 52 and the side structure and in front of the occupant 60. The airbag 100, while inflated, helps protect the vehicle occupant 60 in the second row 54 by absorbing the impact of the occupant.

The airbag 100 includes a first portion 110 and a second portion 120. The first portion 110 inflates and deploys prior to the second portion 120. The first portion 110, when deployed, is positioned laterally (e.g., outboard) from the occupant 60 between the seat 50 and the side structure. The second portion 120, when deployed, is positioned in front of the occupant 60 (e.g., in the direction the occupant faces). The deployed airbag 100 therefore has a generally L-shaped configuration when viewed from above (see FIG. 4B).

The first portion 110 extends from an upper end 102 to a lower end 104 and defines an inflatable volume 112. The upper end 102 is positioned at or below the headrest 57 of the seat 50. The upper end 102 can also extend above the head rest 57 as indicated by the dashed lines 102'. The lower end 104 is connected to the module 68 and fluidly connected to the inflator 74. The lower end 104 therefore extends into and is connected to the base 53. The first portion 110 includes a first or inboard facing side 114 and a second or outboard facing side 116. As noted, the seat 50 can be rotatable and, thus, the portions of the airbag 100 that face inboard or outboard or are positioned inboard or outboard from the centerline 51 can change depending on the rotational position of the seat (not shown).

The second portion 120 is connected to and extends from the inboard facing side 114 of the first portion 110. The second portion 120 extends from an upper end 106 to a lower end 108 and defines an inflatable volume 122. The upper end 106 is positioned adjacent the occupant's head 62 and can extend above the upper end 102 of the first portion 110. The lower end 108 is positioned adjacent or engages the occupant's lap/lower torso 66. The second portion 120 includes a first or occupant facing side 124 and a second side 126 facing away from the occupant 60.

A panel 119 interconnects the first and second portions 110, 120. A passage or opening 118 extends through the panel 119 to fluidly connect the inflatable volumes 112, 122 to one another. Consequently, the size of the opening 118 can be configured to control the flow of inflation fluid (e.g., pressure and/or rate) from the first portion 110 to the second portion 120. In other words, the opening 118 can be configured such that the first portion 110 inflates to a first fluid pressure and the second portion 120 inflates to a second fluid pressure lower than the first fluid pressure.

Because the occupant 60 is belted, a frontal crash resulting in forward occupant 60 movement causes the occupant to bend at the waist and follow an angled or arcuate path toward the second portion 120 of the airbag 100, as indicated generally by the arrow F in FIG. 4A. Characteristic of this angled/arcuate path F, the occupant 60 movement has both forward (i.e., away from the seat back 55) and downward (i.e., towards the seat base 53) components. As noted, there is no vehicle structure in position to act as a reaction surface to constrain movement of the deployed airbag 100.

Advantageously, the first portion 110, which connects the second portion 120 to the seat base 53, acts to restrict/resist movement of the second portion 120 in response to the penetrating occupant 60. More specifically, the first portion 110 anchors the second portion 120 to the seat 50 and becomes tensioned in response to occupant 60 penetration (i.e., the head 62 and torso 64) into the second portion when moving along the arcuate path F. The forward component of occupant 60 movement urges the second portion 120 away from the seat 50. This away-from-the-seat movement tensions the first portion 110, which restricts/resists movement of the second portion 120 in response to the penetrating occupant 60.

As a result, the seat 50 (particularly the base 53), acts as a reaction surface for supporting the second portion 120 against occupant 60 penetration, which allows the second portion to reduce loads on the moving occupant by providing a desired ride-down effect. The ride-down effect afforded by the second portion 120 accommodates the forward moving occupant 60 by cushioning, thereby providing a more gradual deceleration of the penetrating occupant in the forward direction.

In addition to being pushed away from the vehicle seat 50 in response to the forward components of occupant 60 movement along the arcuate path F, the second portion 120 undergoes compression in response to the downward component of the occupant (i.e., the head 62 and torso 64) moving along the arcuate path. The downward component of occupant 60 movement urges the second portion 120 downward toward the seat base 53, which resists downward movement of the second portion 120, causing the second portion to become compressed between the occupant 60 and the seat base 53.

This compressive force is, of course, transferred to the seat base 53 through the occupant's legs 66, which are supported on the seat base. Nevertheless, it is the seat base 53 that ultimately supports the second portion 120. Accordingly, the seat 50 (particularly the seat base 53) serves as the reaction surface for supporting the second portion 120 against occupant 60 penetration, which allows the second portion to reduce loads on the moving occupant by providing a desired ride-down effect. The ride-down effect afforded by the second portion 120 accommodates the downward moving occupant 60 by cushioning, thereby providing a more gradual deceleration of the penetrating occupant in the downward direction.

From the above, it can be seen that the airbag 100 is configured so that the seat 50 acts as a reaction surface for supporting the second portion 120 of the airbag against both forward and downward movements associated with the impact and penetration of a forward-facing, belted occupant in response to a frontal collision. For forward movement, the first portion 110, anchored to the seat 50, acts in tension to support the second portion 120 against forward movement in response to the penetrating occupant 60. For downward movement, the second portion 120 is configured to become compressed between the occupant's torso 64 and the seat base 53 in response to the penetrating occupant.

The configuration of the airbag 100 to provide a desired response or ride-down effect to both forward and downward occupant movement is not happenstance to the second portion 120 simply being positioned in front of the occupant 60. The second portion 120 needs to remain in the area in front of the occupant 60 within a certain proximity to both the occupant's torso 64 and the legs 66. By mounting the airbag 100 to the seat 50, the position of the deployed airbag and its components relative to the seat can be configured with certainty.

With this in mind, the shape/configuration of the second portion 120 can be selected to coincide with anatomical features of an occupant 60 selected as a statistical representative of the population. For example, the second portion 120 can be configured to accommodate a $50^{th}$ percentile (50%) male, meaning that the occupant for which the first portion 120 is modeled is a male that is larger than 50% of the male population. Other occupants for which the second portion 120 can be configured are a larger occupant, such as a 75% male, a very large occupant, such as a 95% male, or a small female, such as a 5% female. Sizes within these bounds can also be selected.

Additionally, configuring the second portion 120 to deploy to a position close to the occupant's legs 66 and torso 64 requires that attention be paid to how the second portion reaches its deployed position in front of the occupant 60. Advantageously, deploying and positioning the second portion 120 via the first portion 110 and inflating the second portion through the opening 118 in the panel 119 allow the inflation and deployment of the second portion to be tailored. Inflating the first portion 110 first allows the first portion to be positioned or substantially positioned prior to inflation of the second portion 120 or a substantial portion thereof.

The timing of the deployment of the first and second portions 110, 120 can be controlled by the size of the opening 118. To this end, reducing the size of the opening 118 results in the first portion 110 inflating/deploying more fully (e.g., to the first fluid pressure) prior to inflation/deployment of the second portion 120 (e.g., to the second fluid pressure) and vice versa. As a result, the first portion 110 can not only inflate/deploy prior to the second portion 120 but also be stiffer than the second portion. By providing a stiff first portion 110, the second portion 120 is provided a more rigid/stable platform from which to deploy.

Due to this construction, the airbag 100 can be configured to have the first portion 110 inflate and deploy to a position forward and lateral of the occupant 60, and to have the second portion 120 then inflate laterally in front of the occupant, in close proximity to, or even touching, the occupant's torso 64 and legs 66. Because the second portion 120 inflates/deploys with the first portion 110 already inflated and positioned, the second portion can be already positioned in front of the occupant 60 while it completes its expansion depth-wise. In this manner, the second portion 120 can be configured to fill the space in front of the occupant and become positioned in close proximity to the occupant 60 so that the occupant can engage the airbag 100 as described above, with the seat 50 acting as the reaction surface.

It is this configuration—allowing the airbag 100 to deploy into this close proximity to the occupant 60—that enables the airbag to utilize the seat 50 as a reaction surface for the forward/downward (arcuate path F) movement of the belted occupant in response to a frontal collision (or forward movement of the occupant relative to the vehicle seat in response to a vehicle collision, e.g., when the seat 50 is rotated or otherwise oriented away from a vehicle forward-facing position). The airbag 100 can therefore be especially advantageous for implementation in a vehicle that lacks reaction surface structure in front of the occupant, or in a vehicle in which the seats can be rotated to face directions where reaction surface structure is lacking.

When a side vehicle crash occurs (see FIG. 4B), the occupant 60 can be urged to move strictly or generally in the inboard-outboard direction of the vehicle (i.e., perpendicular to the vehicle centerline 22). This occurs when the impact is at the left side 28 or right side 30 of the vehicle 20 perpendicular or transverse to the centerline 22. This can also occur in response to an oblique vehicle crash at the front end 24 or rear end 26 of the vehicle 20.

Because the occupants 60 are belted, a side or oblique crash resulting in outboard occupant movement causes the occupant to move laterally towards the first portion 110, as indicated generally by the arrow L in FIG. 4B. It will be appreciated that the direction L can be transverse to the centerline 22 and therefore include both forward and lateral components. In any case, once the moving occupant 60 engages the first portion 110, the first portion is urged to move in the direction L.

The first portion 110, being held in place by its connection to the base 53 and prevented from moving outboard by the C-pillar 47 and/or door 43, provides reaction forces that are opposite the impact forces applied to the airbag by the penetrating occupant 60. In other words, the deployed, stiffer first portion 110 is pinned between the vehicle 20 side structure and the moving/penetrating occupant 60, thereby helping to constrain outboard movement of the occupant. As a result, the first and second portions 110, 120 of the airbag 100 advantageously cooperate to provide reaction forces to the occupant 60 in response to both a frontal vehicle crash as well as an oblique or side vehicle crash.

In will be appreciated that when the seat 50 is rotated to position the airbag 70 inboard of the centerline 51, the first portion 110 can help protect the occupant 60 in response to a lateral or oblique vehicle crash. More specifically, occupant movement in the inboard direction (opposite the direction L) urges the first portion 110 to likewise move in the inboard direction. Although the side structure is no longer present to act as a reaction surface, the seat 50 (more specifically the seat base 53) is connected to the first portion 110 at the lower end 104 and thereby resists/restricts inboard movement of the first portion in the inboard direction. This enables the first portion 110 to rely on the seat base 53 to provide the ride-down effect on the penetrating occupant 60. This can be in addition to any seat 50 adjacent the rotated seat and/or any deployed airbag therebetween (not shown).

Figure 5A:
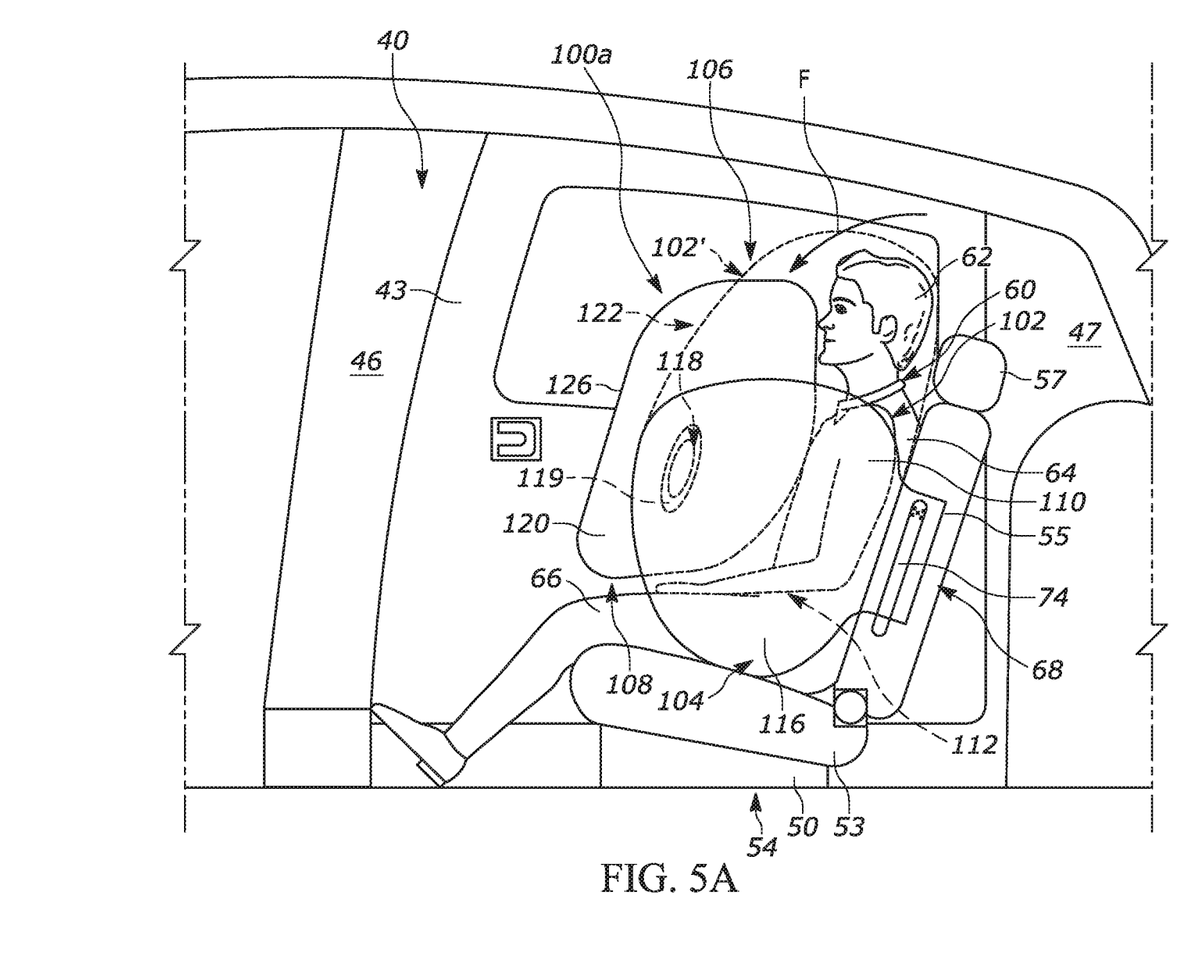
FIG. 5A is a side view of the cabin with another example airbag in a deployed condition.
Figure 5B:
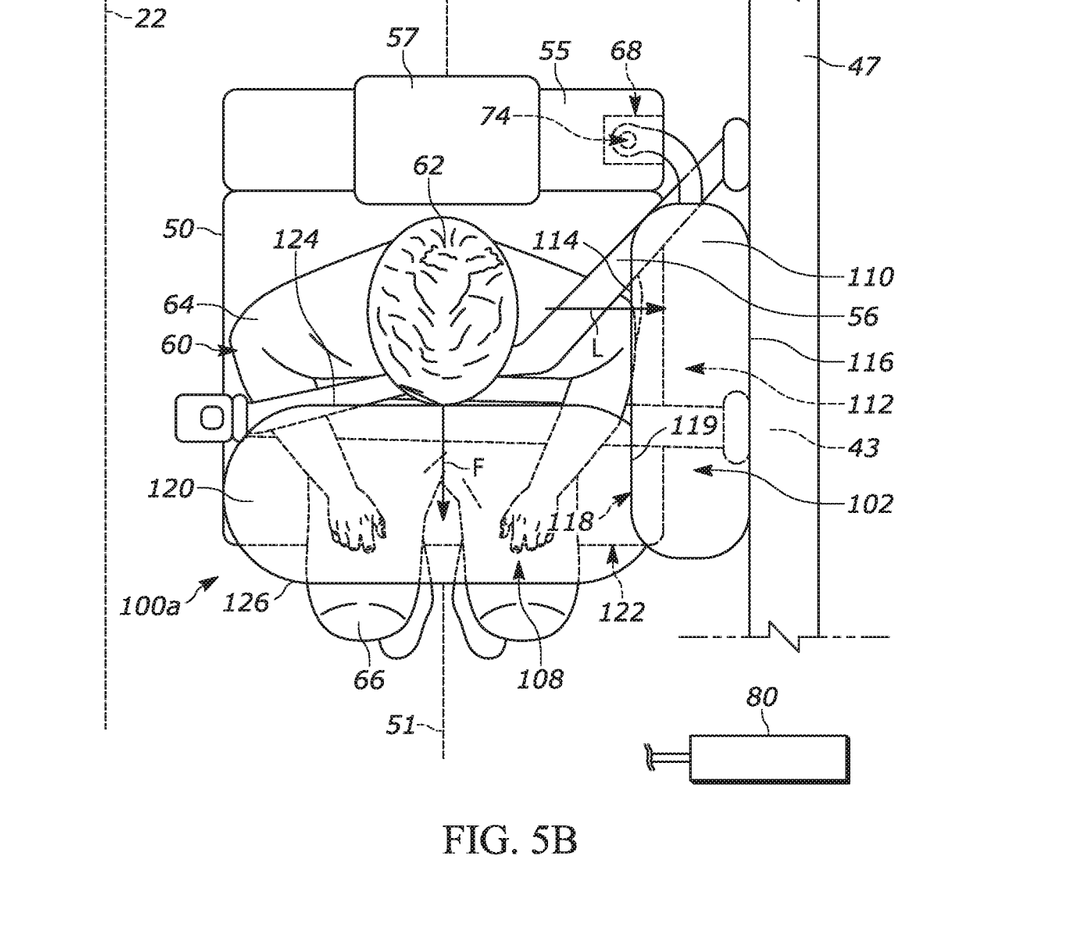
FIG. 5B is a top view of the airbag of FIG. 5A.

In the example shown in FIGS. 5A-5B, the airbag 100*a* and therefore the module 68 are mounted in the seat back 55 of the seat 50. The first portion 110 therefore extends into and is connected to the seat back 55. As noted, a frontal crash results in forward occupant 60 movement in the manner F (FIG. 5A). As a result, the first portion 110, which connects the second portion 120 to the seat back 55, acts to tension the second portion 120 in a direction opposite the impact forces applied to the airbag 100*a* by the penetrating occupant 60. As a result, the seat 50 (particularly the seat back 55), acts as the reaction surface for the second portion 120. The second portion 120 therefore provides a ride-down effect on the moving occupant 60 to thereby help reduce loads thereon. To this end, the second portion 120 accommodates the moving occupant 60 by providing a more gradual reaction force in response to occupant penetration. These reaction forces can be supplemented by those provided by the interaction between the occupant's lap/lower torso 66 and the lower end 108 of the second portion 120.

When a side or oblique vehicle crash occurs (see FIG. 5B), the first portion 110, while being held in place by its connection to the seat back 55, is prevented from moving outboard by the C-pillar 47 and door 43. The first portion 110 thereby provides reaction forces that are opposite the impact forces applied to the airbag by the penetrating occupant 60. In other words, the deployed first portion 110 is pinned between the vehicle 20 side structure and the moving/penetrating occupant 60, thereby helping to constrain outboard movement of the occupant. As a result, the first and second portions 110, 120 of the airbag 100*a* advantageously cooperate to provide reaction forces to the occupant 60 in response to both a frontal vehicle crash as well as an oblique or side vehicle crash.

The airbag 100*a* is also advantageous in that it is capable of protecting the occupant 60 when the seat back 55 is reclined. More specifically, the module 68 is stored in the seat back 55 and, thus, when the occupant 60 reclines the seat 60 in the manner A (see FIG. 2) the module and airbag 100*a* likewise move in the manner A. Consequently, the airbag 100*a* is capable of helping to protect the occupant 60 in both a frontal vehicle crash as well as an oblique or side vehicle crash regardless of the position of the seat back 55 relative to the base 53.

It will be appreciated that if the seat 50 is rotated such that the airbag 100 or 100*a* is moved to a location inboard of the centerline 51 the deploying airbag can utilize the adjacent seat in the same row as the reaction surface (not shown). In other words, the airbag 100, 100*a* could deploy to a position between seats 50 in the same row 52, 54 and rely on the adjacent seat to provide a ride down effect for the penetrating occupant 60 in the event of an oblique or side vehicle crash.

Figure 6A:
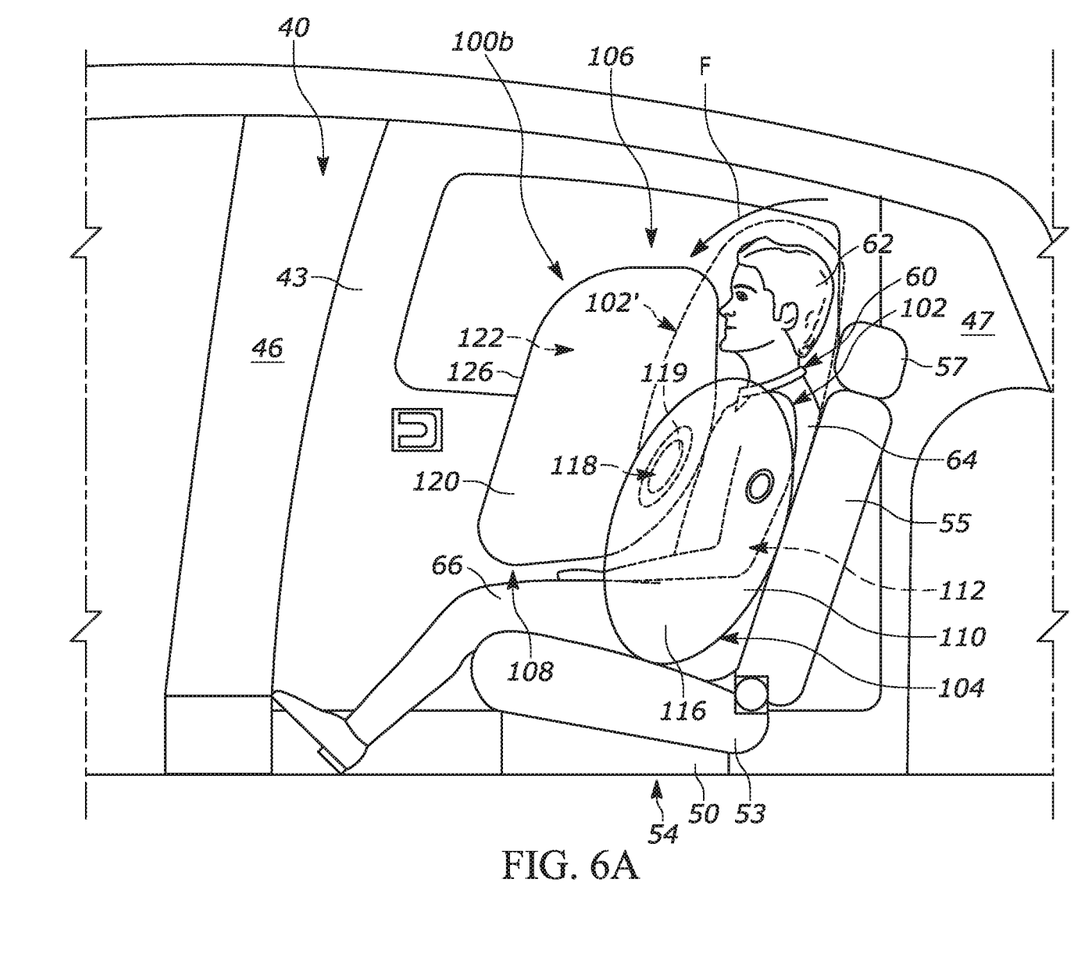
FIG. 6A is a side view of the cabin with another example airbag in a deployed condition and mounted in a vehicle side structure.
Figure 6B:
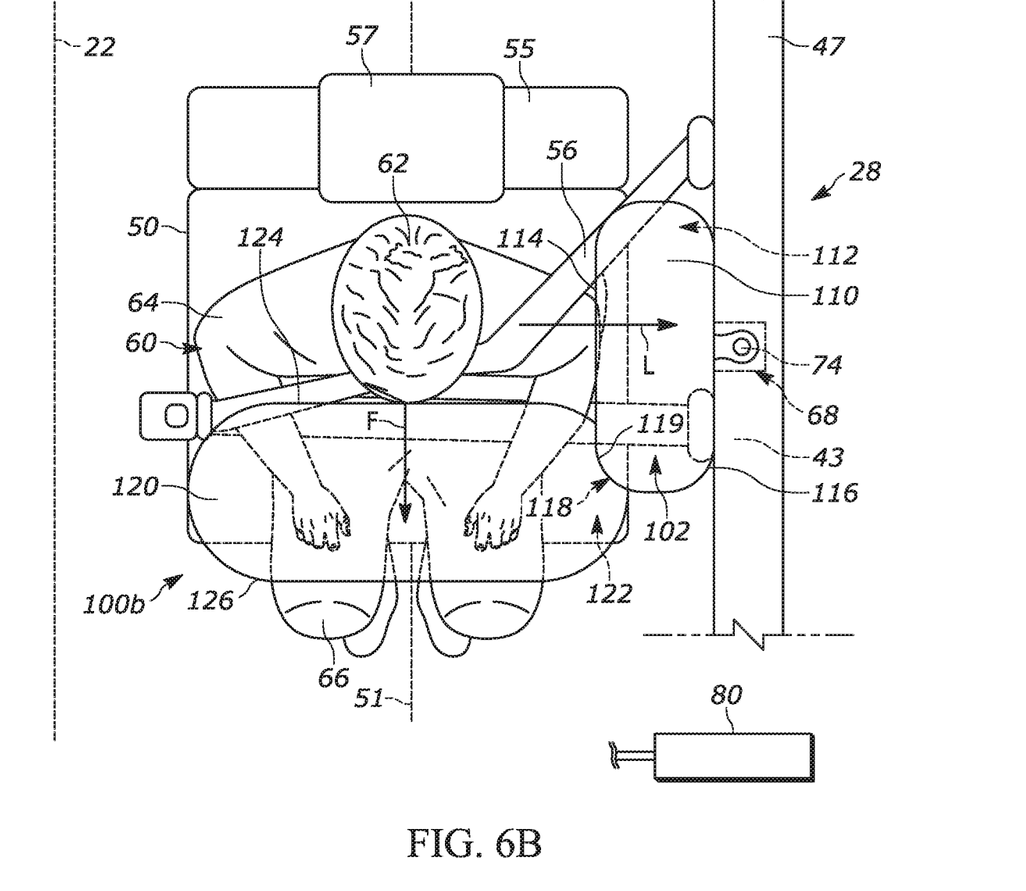
FIG. 6B is a top view of the airbag of FIG. 6A.

In the example shown in FIGS. 6A-6B, the airbag 100*b* and therefore the module 68 are mounted in the side structure—here the rear door 43. The first portion 110 therefore extends into and is connected to the rear door 43. The inflating airbag 100*b* exerts a force on the rear door 43, which causes the rear door to open (e.g., via tear seam or door). This releases the airbag 100*b* to inflate and deploy from a stored condition behind the door 43 to a deployed condition extending into the cabin 40 both between the seat 50 in the second row 54 and the side structure and in front of the occupant 60. In other words, the first portion 110 is positioned lateral of the occupant 60 while the second portion is positioned in front of the occupant. The airbag 100*b* while inflated, helps protect the vehicle occupant 60 in the second row 54 by absorbing the impact of the occupant.

As noted, a frontal crash results in forward occupant 60 movement in the manner F (FIG. 6A). As a result, the first portion 110, which connects the second portion 120 to the C-pillar 47, acts to tension the second portion 120 in a direction opposite the impact forces applied to the airbag 100b by the penetrating occupant 60. The side structure (particularly the door 43) therefore acts as the reaction surface for the second portion 120. Consequently, the second portion 120 provides a ride-down effect on the moving occupant 60 to thereby help reduce loads thereon. To this end, the second portion 120 accommodates the moving occupant 60 by providing a more gradual reaction force in response to occupant penetration in the manner F. These reaction forces can be supplemented by those provided by the interaction between the occupant's lap/lower torso 66 and the lower end 108 of the second portion 120.

When a side or oblique vehicle crash occurs (see FIG. 6B), the first portion 110, while being held in place by its connection to the door 43, is prevented from moving outboard by the C-pillar 47 and door 43. The first portion 110 thereby provides reaction forces that are opposite the impact forces applied to the airbag 100b by the penetrating occupant 60 moving in the manner L. In other words, the deployed first portion 110 is pinned between the vehicle 20 side structure and the moving/penetrating occupant 60, thereby helping to constrain outboard movement of the occupant in the manner L. As a result, the first and second portions 110, 120 of the airbag 100b advantageously cooperate to provide reaction forces to the occupant 60 in response to both a frontal vehicle crash as well as an oblique or side vehicle crash.

From the above, it will be appreciated that the example configurations of FIGS. 2-6B illustrate that the airbags are configured to utilize a combination of the occupant, the seat and/or the vehicle side structure as a reaction surface in both the conventional and unconventional seating arrangements. By "reaction surface," it is meant that it is the occupant, seat and/or vehicle side structure support the airbags against movement in response to impacting occupants moving in the direction F and/or the direction L. In other words, the airbags attempts to move in a first direction (forward/outboard) in response to an impacting occupant and the occupant, seat and/or side structure applies a reaction force to the airbags in a second, opposite (or substantially opposite) direction to limit/prevent movement of the airbags in the first direction. This allows the airbags to absorb impact forces of the occupants and provide the desired ride-down effect.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

We claim:

1. A method for helping to protect an occupant of a vehicle having a side structure and a cabin with a seat for the occupant and a seatbelt comprising a lap belt for restraining the occupant in the seat, comprising:
   providing an airbag in a stored condition offset from a centerline of the seat, the airbag having a first portion and a second portion fluidly connected with one another;
   inflating and deploying the first portion to a position lateral of the occupant;
   inflating and deploying the second portion from the first portion to a position in front of the occupant;
   configuring the first portion to restrain forward movement of the second portion in response to forward occupant movement into engagement with the second portion; and
   configuring the second portion to be positioned between the occupant's torso and upper legs so that the second portion becomes compressed between the occupant's torso and legs when the torso bends forward in response to a collision while restrained by the lap belt so that a seat base of the vehicle seat acts as a reaction surface for the second portion.

2. The method recited in claim 1 further comprising inflating the first portion to a first fluid pressure and the second portion to a second fluid pressure less than the first fluid pressure.

3. The method recited in claim 1 further comprising providing a panel for interconnecting the first and second portions and an opening extending through the panel to fluidly connect the first and second portions with one another.

4. The method recited in claim 3, further comprising sizing the opening such that the first portion fully inflates before the second portion begins inflating.

5. The method recited in claim 1 further comprising inflating and deploying the first portion prior to inflating and deploying the second portion.

6. The method recited in claim 1, wherein the first portion is inflated and deployed to a position between the occupant and the side structure.

7. The method recited in claim 1, wherein the second portion is configured to inflate to a position in close proximity with the occupant's legs.

8. The method recited in claim 1, wherein the airbag is positioned in a pillar of the vehicle.

9. The method recited in claim 1, wherein the airbag is positioned in a door of the vehicle.

10. The method recited in claim 1, wherein the airbag is positioned in a seat base of the seat.

11. The method recited in claim 1, wherein the airbag is positioned in a seat back of the seat.

12. The method recited in claim 1, wherein the first portion extends from an upper end positioned adjacent a headrest of the seat to a lower end positioned adjacent a lower torso of the occupant.

13. The method recited in claim 1, wherein the first portion includes an inboard facing side and an outboard facing side, the second portion deploying from the inboard facing side.

14. The method recited in claim 1, wherein the second portion extends from an upper end positioned adjacent a head of the occupant to a lower end positioned adjacent a lower torso of the occupant.

15. The method recited in claim 1, wherein the first portion and the second portion cooperate to form a substantially L-shaped airbag.

16. The method recited in claim 1, further comprising:
   sensing the occurrence of an event for which deployment of the airbag is desired;
   producing a signal indicative thereof; and
   actuating an inflator to inflate and deploy the first and second portions in response to the signal.

17. An apparatus for performing the method recited in claim 1.

18. A method for helping to protect an occupant of a vehicle having a side structure and a cabin with a seat for the occupant and a seatbelt comprising a lap belt for restraining the occupant in the seat, comprising:
providing an airbag in a stored condition outboard of a centerline of the seat, the airbag having a first portion and a second portion fluidly connected with one another through an opening in a panel;
inflating and deploying the first portion to a position lateral of the occupant;
thereafter, inflating and deploying the second portion from the first portion to a position in front of the occupant, and
configuring the first portion to restrain forward movement of the second portion in response to forward occupant movement into engagement with the second portion; and
configuring the second portion to be positioned between the occupant's torso and upper legs so that the second portion becomes compressed between the occupant's torso and legs when the torso bends forward in response to a collision while restrained by the lap belt so that a seat base of the vehicle seat acts as a reaction surface for the second portion.

19. The method recited in claim 18, further comprising inflating the first portion to a first fluid pressure and the second portion to a second fluid pressure less than the first fluid pressure.

20. The method recited in claim 18, further comprising sizing the opening such that the first portion fully inflates before the second portion begins inflating.

21. The method recited in claim 18, wherein the first portion is inflated and deployed to a position between the occupant and the side structure.

22. The method recited in claim 18, wherein the second portion is configured to inflate to a position in close proximity with the occupant's legs.

23. The method recited in claim 18, wherein the airbag is positioned in a pillar of the vehicle.

24. The method recited in claim 18, wherein the airbag is positioned in a door of the vehicle.

25. The method recited in claim 18, wherein the airbag is positioned in a seat base of the seat.

26. The method recited in claim 18, wherein the airbag is positioned in a seat back of the seat.

27. The method recited in claim 18, wherein the first portion extends from an upper end positioned adjacent a headrest of the seat to a lower end positioned adjacent a lower torso of the occupant.

28. The method recited in claim 18, wherein the first portion includes an inboard facing side and an outboard facing side, the second portion deploying from the inboard facing side.

29. The method recited in claim 18, wherein the second portion extends from an upper end positioned adjacent a head of the occupant to a lower end positioned adjacent a lower torso of the occupant.

30. The method recited in claim 18, wherein the first portion and the second portion cooperate to form a substantially L-shaped airbag.

31. The method recited in claim 18, further comprising:
sensing the occurrence of an event for which deployment of the airbag is desired;
producing a signal indicative thereof; and
actuating an inflator to inflate and deploy the first and second portions in response to the signal.

32. An apparatus for performing the method recited in claim 18.

* * * * *